Patented Oct. 28, 1924.

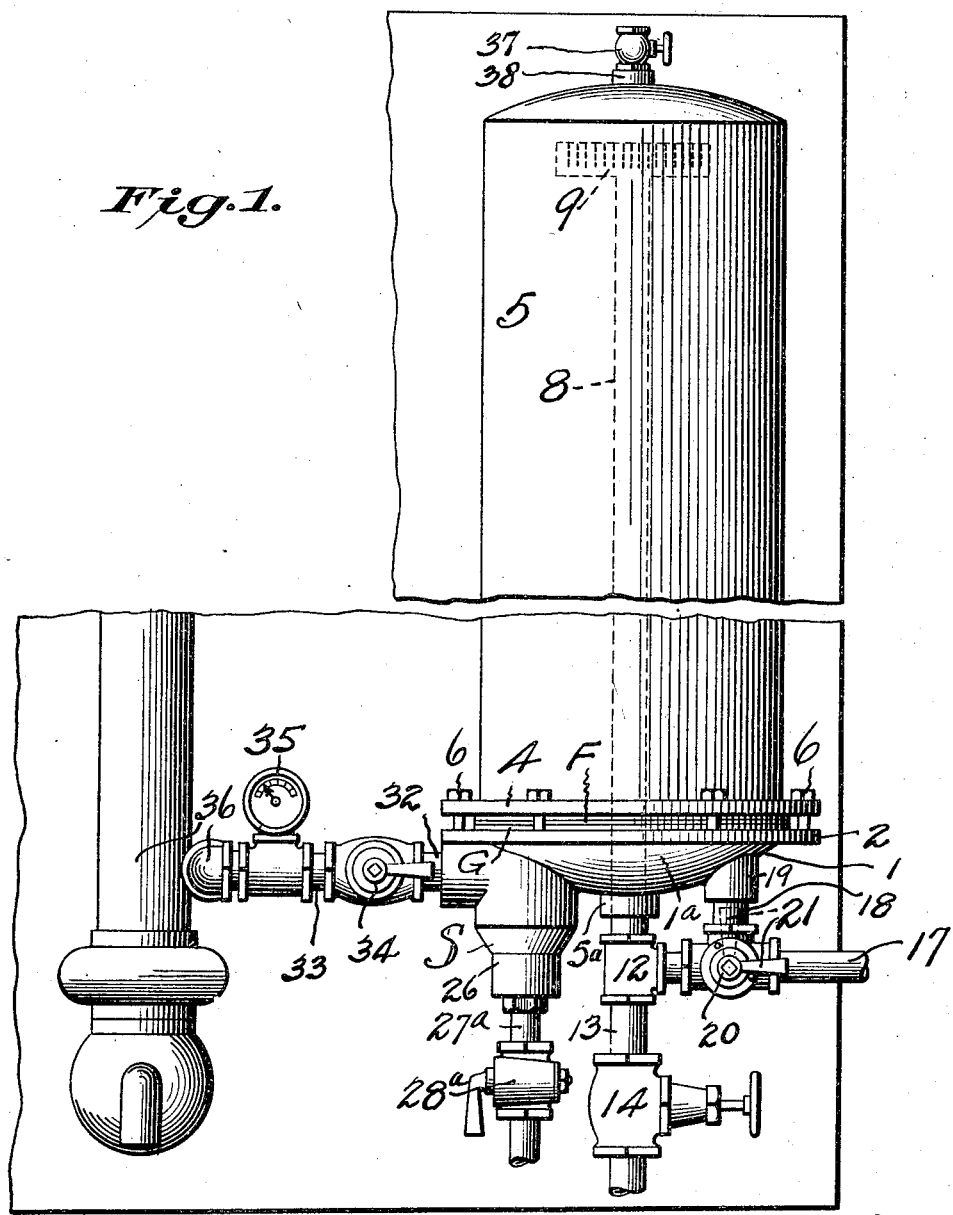

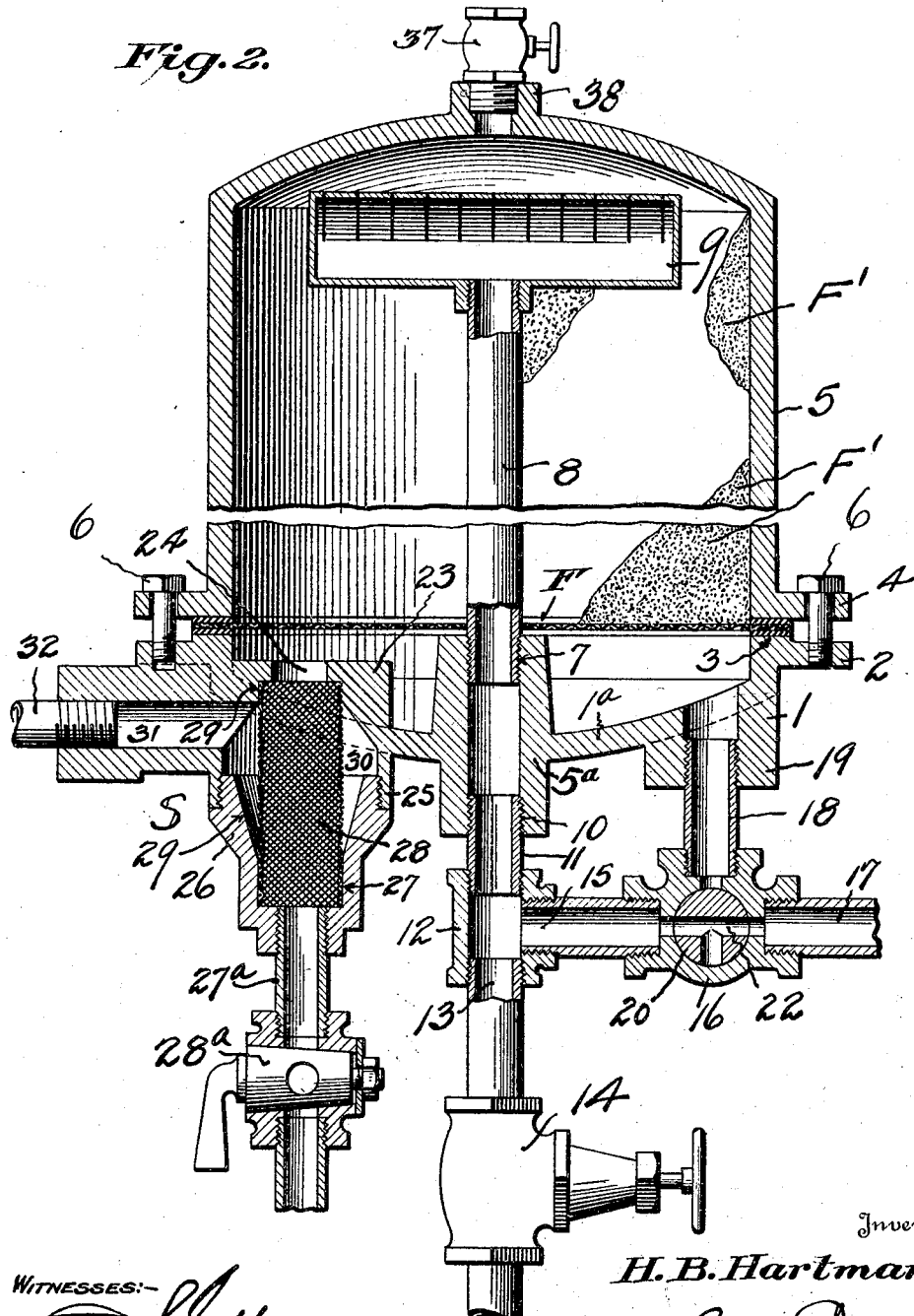

1,513,392

UNITED STATES PATENT OFFICE.

HARRY BUXTON HARTMAN, OF SCOTTDALE, PENNSYLVANIA, ASSIGNOR TO ELECTRIC WATER STERILIZER & OZONE COMPANY, OF SCOTTDALE, PENNSYLVANIA, A CORPORATION OF PENNSYLVANIA.

FILTER.

Application filed February 8, 1922. Serial No. 534,993.

*To all whom it may concern:*

Be it known that I, HARRY B. HARTMAN, citizen of the United States, residing at Scottdale, in the county of Westmoreland and State of Pennsylvania, have invented certain new and useful Improvements in Filters, of which the following is a specification.

This invention relates to an improvement in water purifying apparatus, and more particularly to a novel filter construction for preliminarily straining the water mechanically prior to treatment by other purifying agents such as ozone.

To that end the invention contemplates a simple, practical and reliable device that is particularly adapted for use in connection with water purifying apparatus of the ozone type which frees the water from bacteria but is not intended to dispose of such foreign matter as sand or like sedimentation. Therefore, as its primary object the invention has in view the elimination of suspended matter from the water as well as its general clarification prior to its passage to the ozone for further treatment. Frequently installations are required to be made where the water is taken from muddy or otherwise contaminated sources, and, while the water may become thoroughly purified by the ozone treatment, the ozonizing apparatus will not remove the sediment. Therefore, it is desirable to provide adequate means for mechanically filtering or straining waters of this character before they reach the ozonizing apparatus to insure a thoroughly clarified, as well as pure supply of water for use.

Another object in addition to the foregoing general object is to provide a simple and practical construction that may be easily manufactured and assembled, and which is especially designed to be effectively cleaned or flushed, when necessary, without dismantling any of the apparatus or otherwise interfering with its normal functions.

A further object is to provide a gauge for indicating when the filter should be cleaned.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is an elevation of the improved filter, the same being broken away to reduce the height of the filtering column.

Figure 2 is an enlarged detail vertical sectional view also broken to reduce the height of the column.

Similar reference characters designate corresponding parts throughout the several figures of the drawings.

In the embodiment shown in the drawings, the filter essentially comprises in its organization a base member 1 having the anchoring flange 2 and gasket seat 3 for receiving the gaskets G at the opposite edges of the foraminous filtering plate F which may be secured in place on the seat 3 by the clamping flange 4 of the tank or casing 5 by the clamping bolts 6.

The base member 1 is preferably a casting of substantially dished or bowl shaped formation and has the central fitting receiving boss $5^a$ which projects to opposite sides of the concave bottom wall $1^a$ of the base, and is interiorly threaded as at 7 to receive the feed column 8 carrying at its upper end the main sand strainer 9. The opposite end of this boss $5^a$ is threaded as indicated at 10 to receive the pipe 11 which connects with a T-fitting 12 having its straight-way outlet 13 communicating with a flush valve 14 while the angular outlet 15 communicates with a three-way valve 16. This valve has a raw water inlet connection 17 and a back-wash connection 18 communicating with the boss 19 formed on the bottom of the base 1. The turn plug 20 of the valve is provided with an exterior operating handle 21 whereby the passage 22 thereof may be turned to permit the water from the inlet 17 to flow direct to the feed column 8 when the handle is in the position shown in Figures 1 and 2. On the other hand when the handle 21 is turned to the dotted line position shown in Figure 1 the supply of inlet water will be cut off from the column 8 and turned into the back-wash connection 18 for the cleaning out operation hereinafter more fully referred to.

Another feature of the invention resides in the provision of a special sand strainer unit which insures further clarification of the water before it makes its final exit from the filter. This unit is designated generally as S and may be observed in detail in Figure 2 from which it will be seen that the same consists of a boss 23 having an opening 24 located above the level of the concave bottom wall 1ª of the base and also provided with an exterior collar 25 for receiving the strainer holding plug 26. This plug is preferably formed with an interior bore 27 which receives a tubular screen 28 whose upper end preferably rests in the strainer seat 29 formed in the boss adjacent the opening 24. With this arrangement, all of the water from the receiving bowl formed by the base 1 beneath the filter plate F which supports the desired mechanical filtering medium F¹, passes through the opening 24 and into the vertically disposed tubular screen 28 whereby any solid matter in the water will be finally caught and precipitated into the pipe 27ª which is closed by the sand valve 28ª. Also, as shown in Figure 2 the bore 27 of the plug 26 preferably communicates with a flaring or tapering portion 29 which opens into the enlarged portion of the boss 23 to provide an outlet chamber 30. This chamber 30 communicates with a discharge pipe 31 which receives a pipe 32 of the delivery line designated generally as 33 and including a cut-off valve 34 and pressure gauge 35. This delivery line 33 leads to the ozonizing apparatus of which the mixing column 36 shown in Figure 1 is a part.

The pressure gauge 35 arranged in the delivery line 33 from the filter to the ozonizing apparatus constitutes one of the novel and distinctive features of the present improvement. That is to say, the gauge 35 is used for the purpose of indicating when the filter should be cleaned. For instance, if the initial pressure in the system is 20 lbs. and the back-pressure in the filter increases to a considerable extent so that the gauge shows less than 20 lbs. when the machine is operating, such an indication is a signal that the filter is so dirty or clogged that it is not allowing sufficient water pressure to pass to the ozone apparatus to properly operate the injector, said apparatus being of the type for example shown in my copending application Serial No. 461,504, filed April 15, 1921.

The operation of the filter is substantially as follows:—

Normally the handle 21 of the main two-way valve is in the horizontal position shown in Figure 1 whereby the plug 20 thereof is in the position shown in Figure 2 thereby to permit water to make its way from the inlet 17 to the feed column 8 and thence out of the sand strainer 9 through the filtering material F¹ resting upon the filter plate F. It will of course be understood that while water is supplied to the feed column the flush valve 14 is closed and the sand outlet valve 28ª is also closed, but the valve 34 in the delivery line is open. The filtered water passing into the bowl of base member 1 becomes more or less trapped or retarded temporarily due to the fact that the boss 23 having the opening 24 therein is elevated above the level of the bottom of the base. Therefore, any solid matter that succeeds in passing through the filtering plate F may settle to the floor of the base and thus be prevented from entering the opening 24. However, as a further safeguard against the delivery of sand and other particles to the line 33, the tubular strainer 28 is provided. The sand collected by the strainer 28 is precipitated into the pipe 27ª as heretofore indicated and collects there prior to the opening of the valve 28ª when the device is being cleaned. Therefore, with this additional safeguard the water passing through the outlet 31 of the boss is assured maximum clarification.

When the pressure gauge 35 shows a pressure lower than the normal pressure in the system and thus indicates that the filter is clogged, the handle 21 of the main two-way valve may be placed in the dotted line position shown in Figure 1 whereby water from the feed line 17 will be shunted through the back-wash connection 18 into the bowl of the base 1 and thus through the filter plate F in a direction opposite to the normal flow of the water. When the handle 21 is placed in the vertical position the flush valve 14 is opened but the sand valve 28ª and the cut-off valve 34 remain closed. Then, the raw water entering the device through the back-wash connection 18 will flow upwardly through the plate F and make its way to the feed column 8 through the main sand strainer 9, from whence it goes to waste through the flush valve 14.

Also the sand valve 28ª may be temporarily opened to permit the sand collected in the strainer 28 and pipe 27ª to also flow to waste. It is not desirable that this valve be left open continuously while the valve plug 20 is shunting the supply of raw water in the reverse direction because the pressure through the filtering strata F¹ would be reduced.

After the device has been sufficiently cleaned by back-washing, the handle 21 may be moved to its horizontal position and thus cause the water from the inlet 17 to pursue its normal path to the feed column 8. As the raw water which entered the bowl of the base 1 from the back-washing operation may have carried with it some sediment which was precipitated by the bottom face of the plate F, it may be desirable after the back-washing operation, and before opening the valve 34, to run the filter with the back-wash connection closed by placing the valve 21 in a horizontal position and opening the sand valve 28ª. In that way the filtered water which passes through the filtering material on the plate F will flush out the unfiltered water collected in the bowl of the base member through the sand strainer unit S. When the filtered water has thus been allowed to flow direct to waste through the sand valve 28ª for a few minutes the sand valve may be closed and the cut-off valve 34 opened to thus supply the clarified water to the delivery line 33.

As will also be observed from the drawings the top of the casing or tank 5 is provided with an air valve 37 secured to the fitting 38. The purpose of this valve is to exhaust the air in the casing when the device is originally started or re-started. That is to say, this valve permits the air within the casing to exhaust as the water fills the casing thereby preventing an air pocket. When the filter is filled with water the air valve can be closed and the device can function in its normal way. Also, the boss or fittting 38 into which the air valve is screwed is of such diameter that if it becomes necessary to remove the filtering material F' a rubber hose could be inserted through the hole in the top of the filter and all of the filtering material could be siphoned out by allowing the water to flow into the tank in the same direction as it does when the machine is being flushed. In this way all filtering material could be removed without taking the apparatus apart, and on the other hand new filtering material can be introduced in the same way. The filtering medium used is preferably bone charcoal.

Without further description it is thought that the features and advantages of the present invention will be readily apparent to those skilled in the art, and it will of course be understood that changes in the form, proportion, and minor details of construction may be resorted to without departing from the spirit of the invention or scope of the appended claims.

I claim:—

1. A filter device of the class described comprising a tank including a base and superposed casing, a filtering plate clamped between the base and the casing, a water inlet connection extending upwardly through the base and through the filtering plate into the tank, a flush connection communicating with the base below the filtering plate, a valve for controlling the flow to either the inlet connection or the flush connection, filtered water delivery means connected to the base and having a discharge outlet and providing a filtered water chamber having an opening communicating with the base below the filtering plate, and a screen arranged to receive the water from the base through said opening.

2. A filtering device including a tank comprising a filter casing, a filtered water base member, a filtering plate clamped between the casing and the base, a central boss formed on the base and projecting to opposite sides of the bottom wall thereof, the inner end of the boss constituting a support for the filtering plate, a feed column having a sand strainer at its upper end and its lower end connected with the inner end of said boss, a pipe line connecting with the outer end of said boss and including a flush valve, a back-wash connection also carried by the base and an inlet pipe line including a two-way valve communicating with the back-wash connection and also with the pipe-line between the central boss and the said flush valve therein and a filtered water outlet for the base.

3. A filtering device including a tank comprising a filter casing, a filtered water base member, a filtering plate clamped between the casing and the base, said base having inlet and back-wash connections and a sand strainer unit providing a filtered water outlet, said strainer unit including a boss projecting from the inner face of the base and provided with an opening at a point above the floor of said base, a strainer holding plug detachably fitted to the outer portion of said boss, a tubular screen communicating with said opening in the inner face of the boss, a filtered water outlet formed in the base and communicating with the interior portion of the boss surrounding said screen and a pipe line including a drain valve in direct communication with the interior of the tubular screen.

4. A filtering device of the class described comprising a tank including a base and superposed casing, a filtering plate clamped between the casing and base, an inlet connection for the base and discharging into the tank at one side of the filtering plate, and a filtered water outlet for the base comprising an opening communicating with the base below the filtering plate and an enlarged chamber communicating with said opening and having a water discharge outlet, a tubular screen communicating with said opening, a pipe line in direct communication with the interior of the tubular screen, and a valve in said pipe line.

In testimony whereof I hereunto affix my signature in the presence of two witnesses.

HARRY BUXTON HARTMAN.

Witnesses:
MABEL FREEMAN,
MABEL ROSENSTEELE,